Patented Nov. 28, 1933

1,937,488

UNITED STATES PATENT OFFICE

1,937,488

MANGANESE DIOXIDE

Leslie G. Jenness, Brooklyn, N. Y., assignor to Intermetal Corporation, New York, N. Y., a corporation of Delaware No Drawing. Application October 1, 1932
Serial No. 635,869

16 Claims. (Cl. 23—234)

This invention relates to a method of making and treating manganese dioxide and more especially to the production of a form of manganese dioxide which is foraminate in structure by virtue of the fact that the original manganese compound to which the process of the invention is applied is converted to a form containing a large proportion of divalent manganese, from which intermediate product substantially all this divalent manganese is subsequently removed, thereby converting the intermediate product to manganese dioxide. The resulting product is chemically identical with the manganese dioxide represented by the formula $MnO_2$ but differs markedly from this known material in its physical characteristics. The resulting product also possesses a very loosely knit structure in the particle that may not accurately be termed porous in the same sense in which that term is used to describe certain forms of catalytic material known to the prior art. For while the corroded particles of the present invention, perforate as they undoubtedly are as a result of the treatments hereinafter described, may in a physical sense be called porous, the porosity as such in the view of the present invention is not of catalytic value. This porosity is only an incident of the process to which the particles have been subjected. The superior catalytic activity is due to the fact that the agent which removes the divalent manganese in eating into the mass of the particles has partially liberated from the mass a larger number of active molecules even on the walls of the pores or perforations, and these molecules have probably acquired as a result of the removal treatment more unsatisfied crystal valences than they had before.

The process of the invention is particularly applicable to the treatment of manganese ores but may be applied with advantage to artificially prepared manganese oxides. When made from a manganese ore, such as pyrolusite, the impurities of the ore, chiefly silica, are carried over into the ultimate product but, in so far as these impurities have any effect at all, the effect is slightly beneficial. This product is, for example, a very efficient catalyst, either when used by itself or when used with a very slight percentage of metal manganite promoters.

At the present time there are no known methods for producing manganese dioxide except precipitation methods from manganese salts which require careful manipulation and control of precipitation. The starting material in these methods have usually been manganic salts and/or acids which are expensive and accordingly increase the cost of the manganese dioxide which is obtained. The manganese dioxide prepared by these methods is comparatively inefficient as a catalyst, for instance in the oxidation of carbon monoxide at low temperatures.

Catalysts in the form of metal manganites have also been proposed, and have been sought to be obtained by combining the manganese precipitated from a solution of a manganese salt, with a metal. The catalysts produced in this way are substantially metal manganites; any manganese dioxide present constitutes a small and inactive proportion of the total product. In contradistinction to this type of catalyst, that of the present invention is not prepared by precipitation and consists of a foraminate manganese dioxide comprising substantially all of the active catalytic material of the total mass of the product, and when used with a promoter, as is sometimes desirable, the active catalytic material in the product consists predominantly of manganese dioxide, the metal in the manganite comprising only 5% or less of the total mass.

It is an object of the present invention to provide a process for the production of a foraminate manganese dioxide direct from manganese ore.

It is a further object to produce such a foraminate manganese dioxide which possesses a high catalytic activity, especially suitable as an oxidation catalyst for oxidizing carbon monoxide, hydrocarbons and organic substances in general.

It is a still further object to produce a catalyst which comprises a manganese dioxide that has been rendered foraminate by reason of the fact that a large proportion of its mass has been removed and which when used by itself or with a slight addition of a metal manganite promoter, exhibits an extraordinary efficiency as a catalyst in the removal of even small traces of carbon monoxide and at low temperatures.

For the purposes of a brief illustration, the method of the invention may be described as applied to an original material consisting chiefly of manganese dioxide ($MnO_2$). In this case two major steps are involved. First, the manganese dioxide ($MnO_2$) in the ore is converted into the manganese sesquioxide ($Mn_2O_3$) as thoroughly as possible without disintegration of the particles. The sesquioxide comprises as is well known both divalent and tetravalent manganese. The second step consists in removing this divalent manganese, which may be done by a suitable corroding or etching agent. This apparently leaves a loosely knit particle structure of manganese dioxide ($MnO_2$) presenting relatively large exposed surfaces, as distinguished from the characteristic solid particle structure of the precipitated dioxide. It is this loosely knit structure that results from the removal of the divalent manganese from the sesquioxide ($Mn_2O_3$) which has been referred to hereinabove as a foraminate structure.

The foraminate structure of the particle of the catalyst of the present invention may be defined in the specification and claims as a structure which has been formed by a selective corrosion and surface etching of the particles, the catalytic material (being the tetravalent manganese and its combined oxygen) remaining substantially unattacked by the corroding and etching agent and the catalytic molecules contained in the structure of the particle remaining in substantially the same positions relative to each other as before such treatment. In other words, the particle suffers no substantial change in peripheral dimensions nor disintegration of the structure of the catalytic material, and the removal of the divalent manganese from the particle thus permits a molecular etching on the periphery of the particle and on the surfaces of the pores or foramina thereof. The surface which has resulted from this selective corrosion and etching action carries a large number of molecules which have been partially liberated from the original mass and which possess a high degree of valence unsaturation when viewed in the light of the theory of chemical adsorption as measured by the unsatisfied valences of the molecules of the crystal lattice structure of a particle.

The treatment may be visualized if we consider that $MnO_2$ which is a compound containing manganese in tetravalent form, may be converted, as by reduction, to the sesquioxide, which latter contains not only tetravalent manganese but divalent manganese as well. The sesquioxide, usually denoted by the empirical formula $Mn_2O_3$, may be seen to comprise a manganous salt of manganous acid $H_2MnO_3$ which may be written $MnO.MnO_2$ or $MnMnO_3$ and may well be termed manganous manganite corresponding to the structural formula

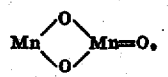

The MnO may be removed from this compound, for instance by treating it with nitric acid and converting the divalent manganese into the nitrate:

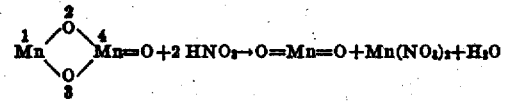

From the foregoing it can be readily perceived that the manganese atom (1) and the oxygen atom (2) are removed from the compound while the remaining oxygen atom (3) attaches itself by a double bond to the manganese atom (4), so that the resulting manganese compound is $O=Mn=O$ or $MnO_2$. The manganese atom (1) is taken up in the nitrate as shown and the oxygen atom (2) is taken up with hydrogen as water. By removing the MnO, the total mass is not appreciably less than that of the original material, but the weight, speaking in terms of atomic weights, has been reduced by 71/158 or about 45%, leaving the $MnO_2$ in a foraminate condition. The foraminate nature of manganese dioxide obtained in accordance with the principles of this invention has been shown by actual test, wherein a sample of 200 mesh pyrolusite ore showed a relative density of only 1.09 after treatment as compared with an original relative density of 1.99. The tremendous increase in available contact surface thus obtained by the foraminate structure, as foraminate is defined in this specification, may be seen to have a distinct bearing on the catalytic activity of the product.

With the above brief characterization of the novel method and product of the present invention in mind, the following illustrative embodiments will give a more detailed understanding of the simple and economical steps by which it may be practiced.

*Example 1*

A 200 mesh pyrolusite ore is first heated to about 200° C. in a stream of methanol vapors for a short period, say 2 hours, to reduce the dioxide to the sesquioxide. As a second step this is discharged into a solution of nitric acid, for instance, a 20% solution, after which it may be digested at slightly elevated temperature, say 80° C., for two or three hours or for a period sufficient to remove the divalent manganese substantially completely. The product may then be filtered, washed, pressed, crushed or broken up, and sized to 8 to 14 mesh, and dried slowly at about 100° C. say from 12 to 18 hours, followed by a more intensive drying of two or three hours at more elevated temperatures, say 200° C. The resulting product is a foraminate and active catalyst capable of oxidizing carbon monoxide at room temperature and at 0° C.

It should be noted that the reduction of the ore should be controlled within certain limits of time and temperature and concentration of the solution, as a too vigorous reduction will reduce the $MnO_2$ to MnO which is, of course, undesirable as too much divalent manganese is produced and the resultant product becomes powdery and loses its foraminate structure. For this reason it may be desirable to subject the ore to the reducing gases in admixture with a predetermined quantity of air, the degree of dilution and the temperature of the mixture being factors which may be varied to control the rate and degree of oxidation. However, a substantially complete reducing treatment may be followed by cooling the resulting product in air in order to oxidize the MnO back to the sesquioxide, and although this procedure may take longer than one designed to accomplish proper reduction in the first instance, it may be carried out with satisfactory results.

The time of treatment in removing the divalent manganese, as in many chemical processes, is variable and depends upon the degree of concentration of the solution and the temperature. These three factors, therefore,—time, temperature and acid concentration—must be determined for each set of constant conditions presented by any specific problem of treatment. The conditions given are, therefore, subject to variation although these conditions yield results which are eminently satisfactory.

*Example 2*

A sample of 200 mesh pyrolusite ore may be heated to around 500° C. for one or two hours in an atmosphere of a hydrocarbon gas such as natural gas or burner gas obtained from the destructive distillation of coal, allowed to cool and then digested in a 20% solution of nitric acid. The product obtained is very similar to that previously described and manifests excellent catalytic activity.

Example 3

A sample of 200 mesh pyrolusite or may be heated to 800° or 900° C. for about two hours, thereby converting it into the sesquioxide, a part of the oxygen being driven off at that temperature. An ore so reduced, when subsequently treated to remove the divalent manganese, while not manifesting the same high degree of catalytic activity as in the examples previously given, when measured by its ability to oxidize carbon monoxide, is definitely foraminate and is entirely satisfactory for certain purposes, for example, as a carrier for other catalytic agents.

While the above examples have been given as illustrative of the principles of the invention as applied to a manganese ore, with the advantages of simplicity and economy of production, it is to be understood that the novel concepts herein set forth may be satisfactorily applied to artificially prepared oxides, which are likewise susceptible of being reduced to the form of the sesquioxide preparatory to final treatment. In this connection it should be understood that the invention may be applied to the treatment of $Mn_2O_3$ or $Mn_3O_4$, either prepared artificially or as found in nature, for instance, as braunite or hausmannite; these compounds being available for initial treatment with the second step of the process as they are already in the form of an oxide lower than $MnO_2$ and contain appreciable quantities of manganese in divalent form. An ore in the form of a carbonate, for instance, rhodocrosite, as well as an artificially prepared carbonate, is likewise susceptible to utilization with the invention by a reduction treatment according to the first step of the process, preceded, if desired, by a preliminary roasting.

It should be noted that nitric acid has been referred to in the specific treatments given in the above examples. This acid has been chosen as one which will satisfactorily react with and remove divalent manganese and will have no action on tetravalent manganese. Other acids having this effect may, of course, be used, and as a specific one I may mention sulphuric acid, in low concentration, approximately 10% or less by volume. The important feature in obtaining the solution of the divalent manganese is that substantially all this salt should be removed without material disturbance of the tetravalent manganese.

The efficient oxidation of carbon monoxide by catalysis is a most important and desirable achievement and is a reaction which may be applied with advantage to innumerable industrial purposes. Nevertheless, there are other types of catalysis which are distinctly important, such, for instance, as the synthesis of methanol, and which may likewise be accomplished by an application of the principles of this invention. For some types of catalysis, however, it is desirable to utilize a "promoter" in order to accelerate the reaction and allow catalysis more effectively to take place. The manganese dioxide of the present invention is especially suited for association with one or more such promoters and not only presents an increased effective and exposed surface available for combination with metals to form such promoters and for contact with the reacting material, but in addition acts as an excellent carrier for such promoters or catalysts. As such, the manganese dioxide of the present invention is distinctly more advantageous than an inert carrier, such as ground glass, porcelain, kieselguhr, pumice, etc. These latter depend largely on mechanical adhesion to support the catalytic material, thus, as a consequence, affording a small contact surface to a comparatively large catalytic bulk.

In order to introduce the promoter into the manganese dioxide produced in accordance with the foregoing principles, the dioxide is immersed in a solution of the salt of the desired metal, whereupon the metal of the solution reacts with part of the manganese dioxide. I have found that copper is a particularly good metal to be combined with the dioxide and when so combined is present on the available surface of the dioxide particles in the form of copper manganite or copper acid manganite, either or both of which cause a very marked improvement in the catalytic activity of the new manganese dioxide, on carbon monoxide oxidation, especially at low temperatures.

The promoter, which may be any metal manganite, forms a more or less continuous film over the manganese dioxide particles and over the cavities and foramina thereof in such a manner that a powerful catalytic action is exerted. The combined catalytic effect of the manganese dioxide and of the metal manganite is at any rate greater than that of the well known combinations at present in use. Indeed, the total catalytic effect of the manganese dioxide of the present invention and of the metal manganite is far greater than the sum of the catalytic effects that might be expected from both of these catalysts according to the teaching of the prior art. Definite measurements prove this to be the case, as will hereinafter appear.

As an example of the association of the promoter with the new manganese dioxide I may immerse the foraminate product in a 10% solution of copper sulphate maintained in a temperature of 60°–80° C. for several hours, after which it will show the presence of a small quantity of copper,—about 2% in this instance. The reaction which takes place is probably either or both of the following:

1. $H_2MnO_3 + CuSO_4 \rightarrow CuMnO_3 + H_2SO_4$
2. $2 H_2MnO_3 + CuSO_4 \rightarrow Cu(HMnO_3)_2 + H_2SO_4$ The pH of the solution decreases during this reaction showing the formation of the acid.

For reactions where a finely divided metal is desired as a catalyst, such as platinum for the oxidation of sulphur dioxide, or nickel for the hydrogenation of oils, the manganese dioxide may be treated with a soluble salt of the desired metal and the resulting product then reduced as with hydrogen. It has been found that platinum can be deposited upon manganese dioxide in this manner and that the resulting product, even with very small amounts of platinum, is very active as a catalyst to effect the reaction of sulphur dioxide with oxygen. The amount of metal present in the manganite film is usually about 2% or 3% of the total mass and should seldom be more than 5%.

The product of the invention, as has been described above, is foraminate because of the removal from the sesquioxide of approximately one-half of its weight by taking from it the divalent manganese and its connected oxygen atoms, and is remarkably catalytic both by itself and together with a suitable promoter. As has also been indicated, this promoter increases the catalytic activity to an extent many times beyond that which might be prophesied for this combination. These results are apparent from the following tests by means of which the activity of the product may be definitely measured.

In carrying out these measurements, the specifications promulgated by the Bureau of Mines for the determination of the catalytic oxidation of carbon monoxide were closely followed although some changes in these specifications were necessary in order to accommodate the material and conditions; but these changes in all cases resulted in more stringent requirements. A layer of the catalyst of a depth of 5 centimeters was provided in a tube of 2 centimeters in diameter and a mixture of dry air and carbon monoxide containing 1% carbon monoxide by volume was passed through this layer at a rate of approximately 1570 cubic centimeters per minute. Two sets of conditions were provided, one a temperature of 25° C. which was taken as a standard of room temperature, and second, a temperature of 0° C. The time during which 100% oxidation of the carbon monoxide occurred under these conditions was taken as the measure of the catalytic activity of the product tested. The samples indicated in the following table, when measured as described, were found to possess, under each set of conditions, the life which is indicated in hours and minutes:

| Sample | Life | |
|---|---|---|
| | At room temperature | At 0° C. |
| Treated Mn ore | 2 hrs. 10 min. | 25 min. |
| Treated ore—copper promoted | 7 hrs. 40 min. | 4 hrs. 40 min. |

From the above, it is noteworthy that the copper promoted treated ore measured for its capacity to oxidize carbon monoxide is 425% more active than the untreated ore, and this activity is due to the mere presence of only approximately 2% of copper as manganite.

As another characteristic of the product, which as above indicated is mose expeditiously obtained direct from the ore, is the fact that small percentages of substantially inert inorganic material, such as silica, are present therein. The amount of silica is dependent upon the grade of the ore, but in a very high grade ore is probably not more than 2% and to that extent detracts from the complete purity of the product as such,—manganese dioxide. Yet this impurity is in no sense disadvantageous in the resulting catalyst as it improves the grain strength of the product. Furthermore, varying percentages of iron compounds occur in many ores but under the conditions of the preparation of the product of the present invention, such iron can have no substantial catalytic effect. This is due to the fact that the treatment with nitric acid to remove the divalent manganese also removes all surface iron whether it be on the exterior surface of the particles or within the pores created by the action of the nitric acid. There may be, however, and sometimes undoubtedly is, a small percentage of iron carried over from the ore to the final product; but in such case this iron is in the interior of the particles where the nitric acid can not reach it and where it can have no catalytic effect.

What I claim is:

1. The method of making catalytic manganese dioxide comprising heating an ore containing manganese of a valence greater than two in a stream of methanol vapors and thereby reducing said ore to a compound containing both divalent and tetravalent manganese, dissolving out the divalent manganese with nitric acid and then filtering, washing, pressing, crushing, sizing and drying the resulting foraminate product.

2. The method of making catalytic manganese dioxide comprising heating an ore containing manganese of a valence greater than two in a stream of methanol vapors and thereby reducing said ore to a compound containing both divalent and tetravalent manganese, dissolving out the divalent manganese and then filtering, washing, pressing, crushing, sizing and drying the resulting foraminate product.

3. The method of making catalytic manganese dioxide comprisng heating an ore containing manganese of a valence greater than two in a reducing atmosphere and thereby reducing said ore to a compound containing both divalent and tetravalent manganese, dissolving out the divalent manganese and then filtering, washing, pressing, crushing, sizing and drying the resulting foraminate product.

4. The method of preparing a catalyst comprising converting a manganese dioxide into manganese sesquioxide, dissolving therefrom substantially all the manganese which is present therein in divalent form, pressing and breaking-up and sizing the resultant foraminate composition and then drying the same.

5. The method of making catalytic manganese dioxide comprising heating a manganese compound containing manganese of a valence greater than two in a reducing atmosphere and thereby reducing said compound to a form containing both divalent and tetravalent manganese and then dissolving out the divalent manganese with nitric acid, thereby leaving a highly catalytic product which has been rendered foraminate by the said removal of divalent manganese.

6. The method of making catalytic manganese dioxide comprising reducing a manganese compound containing manganese of a valence greater than two to a compound containing both divalent and tetravalent manganese and then dissolving the divalent manganese, thereby leaving a tetravalent manganese in a highly catalytic state.

7. The method of making catalytic manganese dioxide which comprises converting manganese dioxide to a manganese oxide form containing both divalent manganese and tetravalent manganese and then dissolving the divalent manganese, thereby leaving tetravalent manganese in highly catalytic form.

8. The method of preparing a catalyst comprising converting manganese dioxide into a compound containing both divalent and tetravalent manganese, and the dissolving therefrom substatially all the divalent manganese, thereby leaving a tetravalent manganese in highly catalytic form.

9. The method of preparing a catalyst comprising converting a manganese dioxide into a compound containing both divalent and tetravalent manganese, removing the divalent manganese, combining the resulting product with 5% or less of a metal as maganite, and then drying the same.

10. The method of preparing a catalyst comprising converting a manganese dioxide into a compound containing both divalent and tetravalent manganese, dissolving the divalent manganese, and then reducing the remaining product to anhydrous form.

11. The method of preparing manganese dioxide which comprises converting an oxy compound containing manganese substantially all of which is in the tetravalent form into a compound containing manganese, part of which is in the divalent form, and then dissolving the divalent manganese, thereby leaving the remaining manganese dioxide in a highly active catalytic form.

12. A manganese dioxide prepared by converting manganese dioxide to an oxy compound containing divalent as well as tetravalent manganese, and then dissolving from the said compound substantially all divalent manganese, the resulting product having a relative density of approximately one-half of that of the original manganese dioxide material before treatment.

13. A manganese dioxide the particles of which are of a foraminate structure and which contain other metals as manganite to the extent of not more than approximately 5%, said manganite being intimately incorporated in the available surface thereof.

14. A foraminate manganese dioxide produced from a manganese ore having incorporated therein part or all of the natural impurities of said ore and having a relative density of slightly more than one-half that of said ore.

15. A foraminate manganese dioxide catalyst having incorporated in its particles approximately 2% of silica or more.

16. A manganese dioxide the particles of which are foraminate and have associated with them 5% or less of a metal other than manganese as manganite.

LESLIE G. JENNESS.

CERTIFICATE OF CORRECTION.

Patent No. 1,937,488.    November 28, 1933.

LESLIE G. JENNESS.

It is hereby certified that error appears in the printed specification of the above numbered patent requiring correction as follows: Page 1, line 19, strike out the word "same"; page 3, line 5, for "or" read ore; page 4, line 47, for "mose" read most; line 136, claim 8, for "the" read then; and line 137, for the syllable "statially" read stantially; and that the said Letters Patent should be read with these corrections therein that the same may conform to the record of the case in the Patent Office.

Signed and sealed this 16th day of January, A. D. 1934.

F. M. Hopkins
Acting Commissioner of Patents.

(Seal)

ganese, and then reducing the remaining product to anhydrous form.

11. The method of preparing manganese dioxide which comprises converting an oxy compound containing manganese substantially all of which is in the tetravalent form into a compound containing manganese, part of which is in the divalent form, and then dissolving the divalent manganese, thereby leaving the remaining manganese dioxide in a highly active catalytic form.

12. A manganese dioxide prepared by converting manganese dioxide to an oxy compound containing divalent as well as tetravalent manganese, and then dissolving from the said compound substantially all divalent manganese, the resulting product having a relative density of approximately one-half of that of the original manganese dioxide material before treatment.

13. A manganese dioxide the particles of which are of a foraminate structure and which contain other metals as manganite to the extent of not more than approximately 5%, said manganite being intimately incorporated in the available surface thereof.

14. A foraminate manganese dioxide produced from a manganese ore having incorporated therein part or all of the natural impurities of said ore and having a relative density of slightly more than one-half that of said ore.

15. A foraminate manganese dioxide catalyst having incorporated in its particles approximately 2% of silica or more.

16. A manganese dioxide the particles of which are foraminate and have associated with them 5% or less of a metal other than manganese as manganite.

LESLIE G. JENNESS.

CERTIFICATE OF CORRECTION.

Patent No. 1,937,488.   November 28, 1933.

LESLIE G. JENNESS.

It is hereby certified that error appears in the printed specification of the above numbered patent requiring correction as follows: Page 1, line 19, strike out the word "same"; page 3, line 5, for "or" read ore; page 4, line 47, for "mose" read most; line 136, claim 8, for "the" read then; and line 137, for the syllable "statially" read stantially; and that the said Letters Patent should be read with these corrections therein that the same may conform to the record of the case in the Patent Office.

Signed and sealed this 16th day of January, A. D. 1934.

F. M. Hopkins
Acting Commissioner of Patents.

(Seal)

CERTIFICATE OF CORRECTION.

Patent No. 1,937,488. November 28, 1933.

LESLIE G. JENNESS.

It is hereby certified that error appears in the printed specification of the above numbered patent requiring correction as follows: Page 1, line 19, strike out the word "same"; page 3, line 5, for "or" read ore; page 4, line 47, for "mose" read most; line 136, claim 8, for "the" read then; and line 137, for the syllable "statially" read stantially; and that the said Letters Patent should be read with these corrections therein that the same may conform to the record of the case in the Patent Office.

Signed and sealed this 16th day of January, A. D. 1934.

F. M. Hopkins
Acting Commissioner of Patents.

(Seal)